Sept. 27, 1966  K. H. MACHER  3,274,887
FOUR-COMPONENT OBJECTIVE HAVING TWO MOVABLE COMPONENTS
Filed Jan. 16, 1963
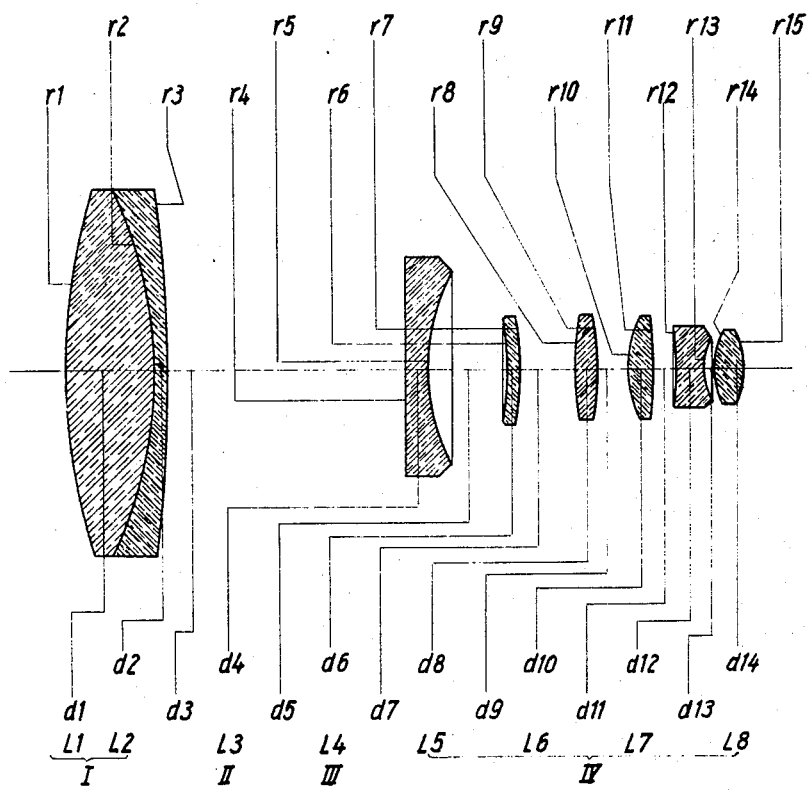
KARL H. MACHER
*Inventor:*
Karl G. Ross
AGENT

United States Patent Office 3,274,887
Patented Sept. 27, 1966

3,274,887
FOUR-COMPONENT OBJECTIVE HAVING TWO MOVABLE COMPONENTS
Karl Heinrich Macher, Bad Kreuznach, Rhineland, Germany, assignor to Jos. Schneider & Co., Optische Werke, Bad Kreuznach, Rhineland, Germany, a corporation of Germany
Filed Jan. 16, 1963, Ser. No. 251,921
Claims priority, application Germany, Apr. 6, 1962, Sch 31,267
2 Claims. (Cl. 88—57)

My present invention relates to a varifocal objective of the type wherein two movable components of negative refractivity are disposed between two fixed components of positive refractivity to form a system of invariable back-focal length, and therefore of fixed image plane, which can be adjusted between a minimum overall focal length $f_{min}$ and a maximum overall focal length $f_{max}$.

The general object of this invention is to provide a high-speed objective of the aforedescribed type which consists of a relatively small number of lenses including a front lens of moderate dimensions, has a large relative aperture with little residual aberration throughout its range of adjustment, and affords uniform illumination of the entire image field even with small diaphragm stops short-range focusing.

This object is realized, in accordance with the instant invention, by the provision of an objective system of the general character set forth above wherein the image-side positive component (i.e. the fixed rear component located on the side of the shorter light rays) consists of a plurality of air-spaced lens members—preferably four—of which the first and the last one are biconvex lenses with external surfaces whose radii of curvature have ratios bearing a predetermined relationship with each other. More particularly, the ratio of the absolute values of the outer (rear) and inner (front) radii of the last lens member should be of the same order of magnitude as the ratio of the absolute magnitudes of the outer (front) and inner (rear) radii of the first lens member of this component, i.e. should range between substantially 0.7 and 1.3 times the latter ratio. Also, the ratio of the absolute values of the radii of the rear and front surfaces of the positive first component should be less than the absolute ratio $f_I/f_{min}$ where $f_I$ is the individual focal length of this first component. Furthermore, the two movable components are constituted by negatively refracting lenses (preferably singlets) with facing concave surfaces, the radius of the concave surface of the second component having an absolute value greater than that of the radius of the confronting concave surface of the third component.

For a satisfactory correction of chromatic aberrations, i.e. suppression of color halos and maintenance of contrasts, I prefer to design the positive first component as a biconvex doublet with a dispersive internal cemented surface whose radius of curvature has an absolute value smaller than that of the radius of its external front surface. For the same purpose it is desirable to construct the first lens member of the positive rear component (i.e. the fifth lens of the system if the front component is a doublet and the two negative components are singlets) as a positive singlet with an Abbé number $\nu < 60.0$.

In order to realize a very compact construction, with a short total axial length and correspondingly reduced front-lens diameter, a further feature of the invention resides in such a dimensioning of the spacing of the two fixed components that the three variable air spaces separating the two variable components from these fixed components and from each other add up to a value which is at most equal to 120% of the absolute value of the individual focal length $f_{II}$ of the second component, i.e. of the more forwardly positioned movable component.

In the sole figure of the accompanying drawing I have shown diagrammatically an objective system representing a preferred embodiment of the invention.

The system illustrated in the drawing consists of a total of eight lenses L1 to L8 constituting four components I, II, III and IV. The fixed component I is a positive doublet consisting of biconvex lens L1 (radii $r1$, $r2$ and thickness $d1$) cemented onto lens L2 (radii $r2$, $r3$ and thickness $d2$) having the shape of a negative meniscus; the internal surface $r2$ of this component is negatively refracting since the refractive index of lens L2 is higher than that of lens L1. A variable air space $d3$ separates the doublet L1/L2 from the second component II which is a nearly planoconcave negative singlet L3 with radii $r4$, $r5$ and thickness $d4$. The concave surface $r5$ of lens L3 confronts, across a variable air space $d5$, a concave surface of smaller radius $r6$ of the meniscus-shaped negative lens L4 which constitutes the third component III and whose thickness and second radius have been designated $d6$, $r7$. A further variable air space $d7$ separates lens L4 from the first lens member L5 of fixed rear component IV which is a biconvex singlet having radii $r8$, $r9$ and thickness $d8$; the other members of this component are a biconvex singlet L6 (radii $r10$, $r11$ and thickness $d10$), a biconcave singlet L7 (radii $r12$, $r13$ and thickness $d12$) and a biconvex singlet L8 (radii $r14$, $r15$ and thickness $d14$), the intervening air spaces having been indicated at $d9$, $d11$ and $d13$.

The following Table A lists representative values for the parameters $r1$ to $r15$ and $d1$ to $d14$ of lenses L1 to L8, their refractive indices $n_d$ and their Abbé numbers $\nu$. The system has a relative aperture of 1:1.8 and a focal length ranging between 50 and 150 units of length (e.g. millimeters), the radii, thicknesses and separations being given in the same linear units.

Table A

|   |   |   |   | $n_d$ | $\nu$ |
|---|---|---|---|---|---|
| I | L1 | $r1 = +290.98$ | $d1 = 42.50$ | 1.61772 | 49.78 |
|   | L2 | $r2 = -216.32$ | $d2 = 7.50$ | 1.75520 | 27.53 |
|   |    | $r3 = -760.07$ | $d3 = 115.36$ | Variable air space | |
| II | L3 | $r4 = -7550.72$ | $d4 = 10.00$ | 1.62041 | 60.29 |
|   |    | $r5 = +101.16$ | $d5 = 39.35$ | Variable air space | |
| III | L4 | $r6 = -88.75$ | $d6 = 5.00$ | 1.62041 | 60.29 |
|   |    | $r7 = -209.77$ | $d7 = 27.80$ | Variable air space | |
| IV | L5 | $r8 = +260.02$ | $d8 = 10.00$ | 1.52310 | 50.93 |
|   |    | $r9 = -172.42$ | $d9 = 15.00$ | Air space | |
|   | L6 | $r10 = +50.80$ | $d10 = 12.50$ | 1.74400 | 44.90 |
|   |    | $r11 = -575.75$ | $d11 = 12.00$ | Air space | |
|   | L7 | $r12 = -78.31$ | $d12 = 13.75$ | 1.74080 | 28.05 |
|   |    | $r13 = +31.25$ | $d13 = 4.00$ | Air space | |
|   | L8 | $r14 = +42.03$ | $d14 = 15.00$ | 1.67790 | 55.52 |
|   |    | $r15 = -59.76$ | $d_{total} = 329.76$ | | |

As will be noted from the foregoing Table A, the outer and inner radii $r15$, $r14$ of the last lens L8 of rear component IV have a ratio whose absolute value (1.42) lies between 0.7 and 1.3 times, i.e. 1.06 and 1.96, of the absolute value (1.51) of the ratio of the outer and inner radii $r8$, $r9$ of the first lens L5 of this component. The ratio of the external radii $r3$ and $r1$ of front lens L1 has an absolute value of 2.61 which is less than the absolute quotient (8.12) of the individual focal length $f_I$=406.1 of this front lens divided by the minimum focal length $f_{min}$=50 of the overall system. It will further be seen that the internal radius $r2$ of component I, i.e. lens L1, has an absolute value less than that of the radius $r1$ of its front surface and that the three variable air spaces $d3$, $d5$ and $d7$ add up to a length of 182.51 which is less than 120% of the absolute value (192.18) of the individual focal length $f_{II}$=−160.15 of the first movable component II. The Abbé number $v$ of the first lens L5 of rear component IV is less than 60.

The values for air spaces $d3$, $d5$ and $d7$ given in Table A are for an intermediate overall focal length $f$=100. The following Table B lists their values for different positions of adjustment:

Table B

| $d3$ | $d5$ | $d7$ | $f$ |
|---|---|---|---|
| 6.86 | 114.00 | 31.64 | 50 |
| 115.36 | 39.35 | 27.80 | 100 |
| 164.59 | 11.46 | 6.45 | 150 |

I claim:
1. An optical objective comprising a biconvex doublet L7, L2 constituting a fixed positive first component I, a lens L3 constituting a negative second component II, a lens L4 constituting a negative third component III, and a fixed positive fourth component IV consisting of a plurality of air-spaced lens members L5, L6, L7, L8; said second and third components being movable, relatively to each other and to said first and fourth components, into a first position in which the objective has a relatively small focal length, a second position in which the objective has an intermediate focal length, and a third position in which the objective has a relatively large focal length; said lenses L1 to L8 having radii of curvature $r1$ to $r15$ and thicknesses and separations $d1$ to $d14$ whose numerical values, based upon a value of 100 units for an intermediate overall focal length, together with their refractive indices $n_d$ and Abbé numbers $v$ are substantially as given in the following table, with the spacings $d3$, $d5$ and $d7$ given for said second position:

| | | | | $n_d$ | $v$ |
|---|---|---|---|---|---|
| I | L1 | $r1 = +290.93$ | $d1 = 42.50$ | 1.61772 | 49.78 |
| | L2 | $r2 = -216.32$ | $d2 = 7.50$ | 1.75520 | 27.53 |
| | | $r3 = -760.07$ | $d3 = 115.36$ | Air space | |
| II | L3 | $r4 = -7550.72$ | $d4 = 10.00$ | 1.62041 | 60.29 |
| | | $r5 = +101.16$ | $d5 = 39.35$ | Air space | |
| III | L4 | $r6 = -88.75$ | $d6 = 5.00$ | 1.62041 | 60.29 |
| | | $r7 = -209.77$ | $d7 = 27.80$ | Air space | |
| IV | L5 | $r8 = +260.02$ | $d8 = 10.00$ | 1.52310 | 50.93 |
| | | $r9 = -172.42$ | $d9 = 15.00$ | Air space | |
| | L6 | $r10 = +50.80$ | $d10 = 12.50$ | 1.74400 | 44.90 |
| | | $r11 = -575.75$ | $d11 = 12.00$ | Air space | |
| | L7 | $r12 = -78.31$ | $d12 = 13.75$ | 1.74080 | 28.05 |
| | | $r13 = +31.25$ | $d13 = 4.00$ | Air space | |
| | L8 | $r14 = +42.03$ | $d14 = 15.00$ | 1.67790 | 55.52 |
| | | $r15 = -59.76$ | | | |
| | | $d_{total} = 329.76$ | | | |

2. An objective as defined in claim 1 wherein said spaces $d3$, $d5$ and $d7$ have substantially the following values in said first and third positions:

| | $d3$ | $d5$ | $d7$ |
|---|---|---|---|
| First position | 6.86 | 144.00 | 31.64 |
| Third position | 164.59 | 11.46 | 6.45 |

References Cited by the Examiner

UNITED STATES PATENTS 3,057,257  10/1962  Klemt et al. _____ 88—57

FOREIGN PATENTS 1,308,216  9/1962  France.

JEWELL H. PEDERSEN, *Primary Examiner.*

JOHN K. CORBIN, *Examiner.*